(12) United States Patent
Boyd et al.

(10) Patent No.: US 10,391,543 B2
(45) Date of Patent: Aug. 27, 2019

(54) HIGH RATE PULSING WING ASSEMBLY LINE

(71) Applicant: The Boeing Company, Chicago, IL (US)

(72) Inventors: Philip W. Boyd, Maple Valley, WA (US); John W. Hall, Covington, WA (US); Clayton L. Munk, Maple Valley, WA (US); James C. Roberts, Puyallup, WA (US); Michael J. Fant, Federal Way, WA (US); Richard D. Fiedler, Kent, WA (US); Barry A. Lewis, Kent, WA (US); Samuel R. Dobbs, Issaquah, WA (US); Gary E. Mansell, Renton, WA (US)

(73) Assignee: The Boeing Company, Chicago, IL (US)

(*) Notice: Subject to any disclaimer, the term of this patent is extended or adjusted under 35 U.S.C. 154(b) by 247 days.

(21) Appl. No.: 15/591,376

(22) Filed: May 10, 2017

(65) Prior Publication Data

US 2017/0239706 A1    Aug. 24, 2017

Related U.S. Application Data

(63) Continuation of application No. 14/183,034, filed on Feb. 18, 2014, now Pat. No. 9,676,497, which is a continuation-in-part of application No. 12/691,307, filed on Jan. 21, 2010, now Pat. No. 8,661,684.

(51) Int. Cl.
*B23Q 1/44* (2006.01)
*B21D 53/92* (2006.01)
*B64F 5/10* (2017.01)

(52) U.S. Cl.
CPC ............ *B21D 53/92* (2013.01); *B64F 5/10* (2017.01); *Y10T 29/53013* (2015.01); *Y10T 29/53091* (2015.01); *Y10T 29/53974* (2015.01)

(58) Field of Classification Search
CPC . B23Q 1/03; B23Q 1/262; B23Q 3/00; B23Q 3/06; B23Q 3/154; B23Q 5/00; B23Q 5/009
See application file for complete search history.

(56) References Cited

U.S. PATENT DOCUMENTS

| | | | | |
|---|---|---|---|---|
| 8,661,684 B1* | 3/2014 | Boyd | ..................... | B21D 53/92 29/407.1 |
| 9,676,497 B2* | 6/2017 | Boyd | ..................... | B21D 53/92 |
| 2014/0157588 A1* | 6/2014 | Boyd | ..................... | B21D 53/92 29/703 |
| 2017/0239706 A1* | 8/2017 | Boyd | ..................... | B21D 53/92 |

* cited by examiner

*Primary Examiner* — Lee D Wilson
(74) *Attorney, Agent, or Firm* — Felix L. Fischer

(57) ABSTRACT

A single piece pulsed flow wing assembly method providing for horizontal wing manufacture is accomplished using synchronized automated vehicles guided in a predetermined manner to move and, locate wing structure in a plurality of assembly positions. Multi-axis assembly positioning systems (MAPS) are used at each assembly position to support and index components in the wing structure and determinant assembly techniques are used for indexing of the components. Modular automated manufacturing processes employing magnetic assembly clamping, drilling, fastener insertion, and sealant application are employed.

15 Claims, 14 Drawing Sheets

HIGH RATE PULSING WING ASSEMBLY LINE

REFERENCE TO RELATED APPLICATIONS

This application is a continuation of application Ser. No. 14/183,034 filed on Feb. 18, 2014, now U.S. Pat. No. 9,676,497 issued on Jun. 13, 2017 which is a continuation-in-part of application Ser. No. 12/691,307 filed on Jan. 21, 2010 now U.S. Pat. No. 8,661,684 issued on Mar. 4, 2014, both entitled HIGH RATE PULSING WING ASSEMBLY LINE having a common assignee with the present application, the disclosures of which are incorporated herein by reference as though fully set forth.

BACKGROUND INFORMATION

Field

Embodiments of the disclosure relate generally to the field of manufacturing of aircraft subassemblies and more particularly to embodiments for high rate pulsing of an assembly line through multiple positions employing interchangeable automated guide vehicles with task specific headers for transfer to multi-access position systems for subassembly support at each position for determinant assembly.

Background

Existing Aircraft wings are assembled in a vertical orientation and are held in large floor mounted assembly fixtures that control the location of the major components until they are fastened together and become sufficiently stable. Wings are then transported with overhead building cranes and placed in a horizontal orientation in a lay down fixture or dolly to continue the assembly process. Mechanics and their tools are transported between floors of scaffolding and between the multiple rate fixtures. Operations are batch processed and drilling and installation of the thousands of high tolerance fasteners are done manually. They use large expensive dock assembly systems that are not capable of pulsing the wing to specialized assembly stations. They all use overhead building cranes that require specialized crews to attach and move the wing. They also require a "high bay" (40'-75' high) facility. The time to move as well as scheduling delays makes this approach impractical for a takt time paced assembly line.

Recurring labor associated with existing production systems can be fairly expensive and requires non-value added time for rotating the wing, setting up the portable drilling equipment and removing, deburring and reinstalling the lower panel. Additionally, it is not possible to use "C" frame or Yoke automatic fastening systems on closed wing structure such as a wing box with both panels attached. Manual drilling and fastening which is therefore required may have undesirable ergonomic and quality issues.

Prior art practice for production of aircraft wing assembly uses large floor mounted "end gate" castings at multiple dock or stationary locations to clamp and hold the various sub-assemblies together until they are drilled, disassembled, deburred, reassembled and permanently fastened. These multi-ton large weldments or cast tools which locate the side of body components together are expensive and impractical to move through a horizontal pulsing assembly line.

Existing production assembly systems for aircraft wing moving lines rotate the wing so that the upper and lower panel drilling is done manually or via portable semi-automated drilling systems from above the wing. In traditional monument based vertical assembly systems wings are drilled and countersunk manually or with portable equipment that is moved from fixture to fixture. Both systems require the panel to be removed and debured and then reassembled. Existing systems that do not require disassembly and deburring must employ large "C" frame or Yoke riveters that work on part that have access on both sides.

It is therefore desirable to provide horizontal pulsing assembly lines with automated transport systems for a partially assembled wing and automated systems to drill and install fasteners for the main wing box of commercial airplanes. It is further desirable that the transport system be reconfigurable for right hand and left hand wings as well as be segmented to provide a smaller storage footprint and allow mechanics access to temporarily secure the lower panel to the wing box. It is also desirable that the transport system load the lower panel from under the wing box.

If is additionally desirable that the side of body geometry be located and held in configuration as it progresses through the different assembly positions until it is fully fastened without the use of large heavy traditional tooling.

SUMMARY

A single piece pulsed flow wing assembly method providing for horizontal wing manufacture uses synchronized automated vehicles guided in a predetermined manner to move and, locate wing structure in a plurality of assembly positions. Multi-axis assembly positioning systems (MAPS) are used at each assembly position to support and index components in the wing structure and determinant assembly techniques are used for indexing of the components. Modular automated manufacturing processes employing magnetic assembly clamping, drilling, fastener insertion, and sealant application are employed.

Exemplary embodiments provide a method and apparatus wherein determinant assembly of an aircraft structure is accomplished in three assembly positions with loading a front spar with attached mechanical equipment interface fittings (MEs) and a rear spar with attached MEs onto multiple front and rear Multi-Axis Positioning Systems (MAPS) of a first assembly position. The MAPS supporting the front spar in 3 axes are then adjusted to place the front spar in a wing reference frame and ribs are stacked on the front and rear spars. The ribs are attached to the front spar and the MAPS supporting the rear spar are adjusted to align determinant assembly (DA) holes in the ribs and rear spar for proper positioning in the wing reference frame. Fasteners are then installed to secure the ladder assembly of the wing structure.

At predetermined assembly points, a planar laser is used to determine relative displacement from the wing reference frame of defined measurement points on the wing structure assembly due to flexing of the assembly and tooling resulting from addition of mass to the assembly. The MAPS are then adjusted to bring the measurement points back into wing reference frame position.

In an exemplary embodiment, a wing side of body geometry tool is installed as a dummy rib and the tool is pinned to the spar terminal fittings. The forward web and aft web are installed and accurately located to the front spar and rear spar with DA holes in common to the spar terminal fittings. The upper panel is loaded onto the ribs and flexed by pushers mounted on the applied tool until the DA holes in the webs and chords are aligned. Temporary fasteners are then installed.

Movement of the wing structure between assembly positions is accomplished by mounting location-specific headers on identical AGVs for inner and outer wing structure support with left and right wing designations. The header type sensed and each AGV is synchronously controlled based on header type.

For continued processing, the AGVs are positioned under the wing structure as supported in the MAPS of the first position. The headers are raised with point support mechanisms controllable in multiple axes to engage the wing structure. The MEs are released from the MAPS in the first position and retracted. The AGVs supporting the wing structure are then synchronously moved to a second assembly position. In one exemplary configuration, prior to releasing the MEs, load cells in the point support mechanisms and fixture receivers are used to confirm that load of the wing structure is being borne by the AGV headers.

For continued assembly, the headers on the AGVs are positioned for engagement of the MEs attached to the wing structure with the fixture receivers of a plurality of MAPS in a second assembly position. The MAPS in the second assembly position are extended to engage ME headers with fixture receivers in the MAPS and the fixture receivers are clamped to the ME headers. The AGV headers are then withdrawn. The planar laser is then employed again to determine relative displacement from the wing reference frame of the defined measurement points on the wing assembly and the MAPS are adjusted to bring the measurement points back into wing reference frame position.

The lower wing panel is then loaded onto the headers of the AGV pair and synchronously moved with the AGVs to position the lower wing panel under the wing structure supported in the MAPS in the second assembly position. The combined headers and the AGVs are controlled to accomplish a synchronized multi-axis coordinated motion to insert the lower skin into position on the wing structure aligning DA holes in the lower skin panel with spar fitting attachment points. The lower skin panel is then urged against the wing structure using the support point mechanisms for firm engagement with the wing structure. Press up forces of the panel to the main wing box structure are monitored using the load cells to assure that excessive forces are not used and if force limits are exceeded audible and visual alarms are set off and motion of the AGVs and associated fixtures is stopped. The lower skin panel is then flexed using the pushers on the wing side of body tool until DA holes in the forward and aft web are aligned with corresponding DA holes in the lower panel cord to set the contour. The lower wing panel is sealed and permanent tack fasteners are installed. The AGV headers are then adjusted to assume the wing structure load and the MEs are released from the MAPS in the second assembly position. The MAPS are retracted and the wing structure is synchronously moved with the AGVs to a third assembly position.

A plurality of MAPS are suspended from a positioning truss mounted to a Floor Mounted Universal Holding Fixture (FUHF). The headers on the AGVs are positioned for engagement of the MEs on the wing structure with the fixture receivers of the MAPS in the third assembly position. The MAPS are extended to engage the ME headers with the fixture receivers and the fixture receivers are clamped on the ME headers. The AGV headers are then withdrawn.

The planar laser may again be used to determine relative displacement from the wing reference frame of defined measurement points on the wing structure assembly and the MAPS adjusted in the third assembly position to bring the measurement points back into wing reference frame position.

Multiple Automated Wing Fastener Installation Systems (AWFIS) are provided and brought into operating position on positioning guideways under the FUHF. The surface of the lower wing panel is contacted with the automated fastening head on each AFWIS from the outside of the wing structure. Upward force is provided by the head in conjunction with an electromagnet energized to create an electromagnetic field pulling a steel backing plate inside the wing structure to provide sufficient clamping force to close any gaps between the structure. The AFWIS systems each accomplish drilling, countersinking, applying sealant and inserting bolts into the lower wing panel and ribs or spars with the head.

The wing structure is then dihedrally canted with the MAPS actuators and the wing structure is lowered onto a transfer dolly. The MEs are released from the MAPS and the MAPS are retracted. The transfer dolly is then pulsed to the next assembly position for the aircraft.

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein employ determinant assembly (DA) techniques to assemble exemplary main wing components, thereby allowing the assembly fixtures to be smaller and more flexible. The system is a single piece flow, takt time paced pulsing assembly line that moves the wings to positions where mechanics and automated machines perform specialized work. The embodiments described may be mirrored for two linear assembly lines (right and left hand) that have three specialized assembly stations where the mechanics have tools that are optimized to perform efficient location (using determinant assembly features such as surfaces and coordination holes), drilling and fastening operations to the ribs, spars, panels and various structural fittings. The holding fixtures at each position are programmable and retract to provide clearance for the wing moves and to allow compensation for tooling deflection and tooling inaccuracies. A planar locating laser system measures key targets of the wing and communicates the inaccuracies to a fixture controller which adjusts the holding fixtures until the errors are eliminated. When the takt time clock reaches 0, the partially assembled wings automatically pulse to the next position using two electronically synchronized AGVs that are not physically connected. In Position 1 initial assembly of wing structure from spars, ribs and the upper panel is accomplished. In Position 2 the lower panel is loaded automatically via the AGVs and is located to the ladder structure via DA holes. The panel is sealed, permanent tack fasteners are installed, and the wing is transported to Position 3 were it is held from above. In position 3 a one sided automated system is used to electromagnetically clamp-up the lower wing panel to spar or ribs, drill and countersink, install sealant, insert interference fit bolts. The side of body webs are fastened while the side of body panel fittings and spar terminal fittings are held in engineering configuration by a small light weight tool that uses a combination of determinant assembly holes in the chords, web and terminal fittings as well as an applied tool that acts as a dummy rib to set the distance and angularity between the front and rear spar terminal fittings. Mechanics can work concurrently on the wing with the automated fastening machines once a zone is completed and vacated. Once the wing is fastened it is lowered onto a wheeled cart, is pulsed out of position 3 and continues down the associated aircraft assembly line. The wing can be pulsed or can continually move down the assembly line as major fittings as well as leading and tailing edge components are installed to the wing box.

Figure 1:
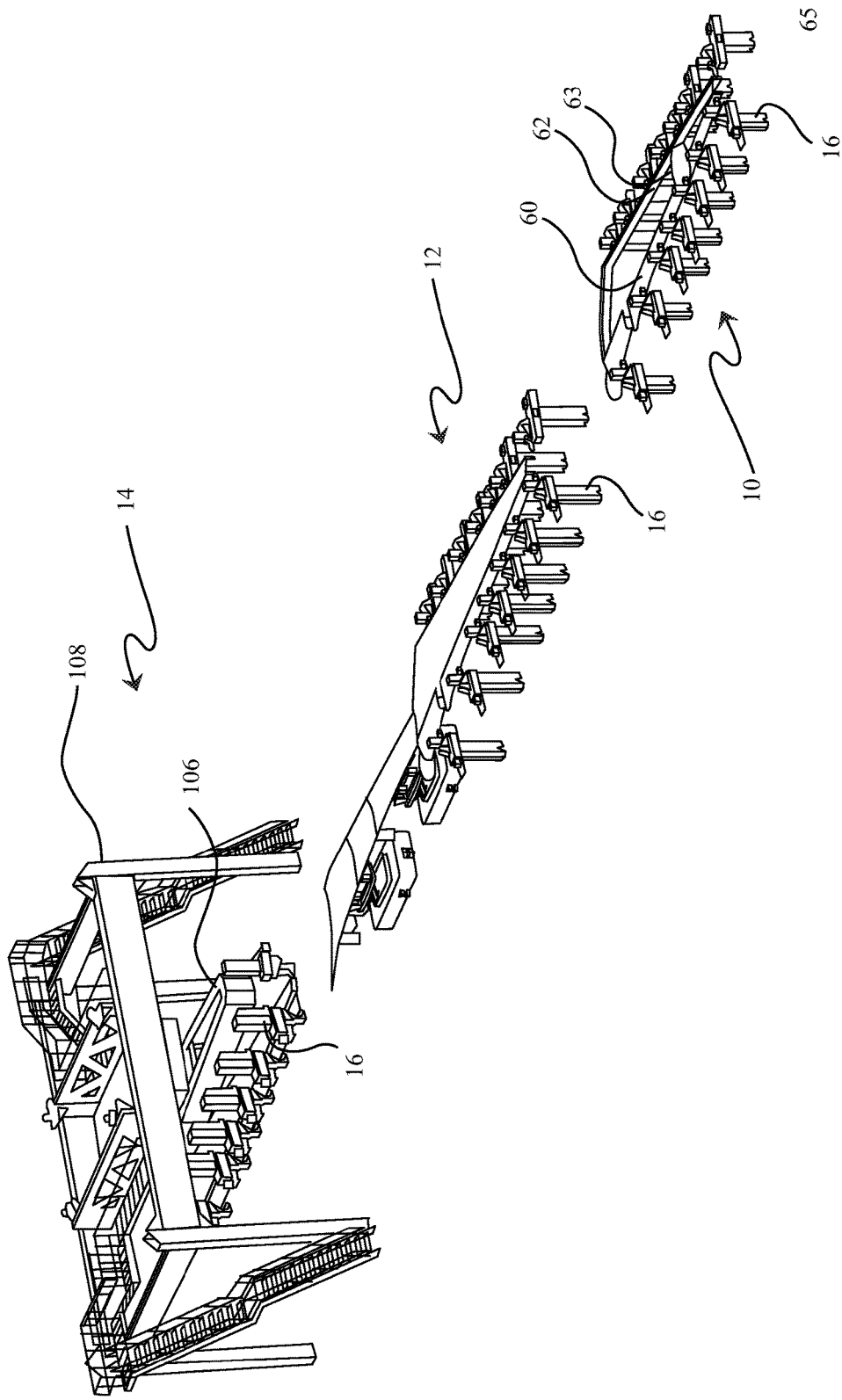
FIG. 1 is a perspective view of a multi-position wing assembly line employing an exemplary embodiment.
Figure 2:
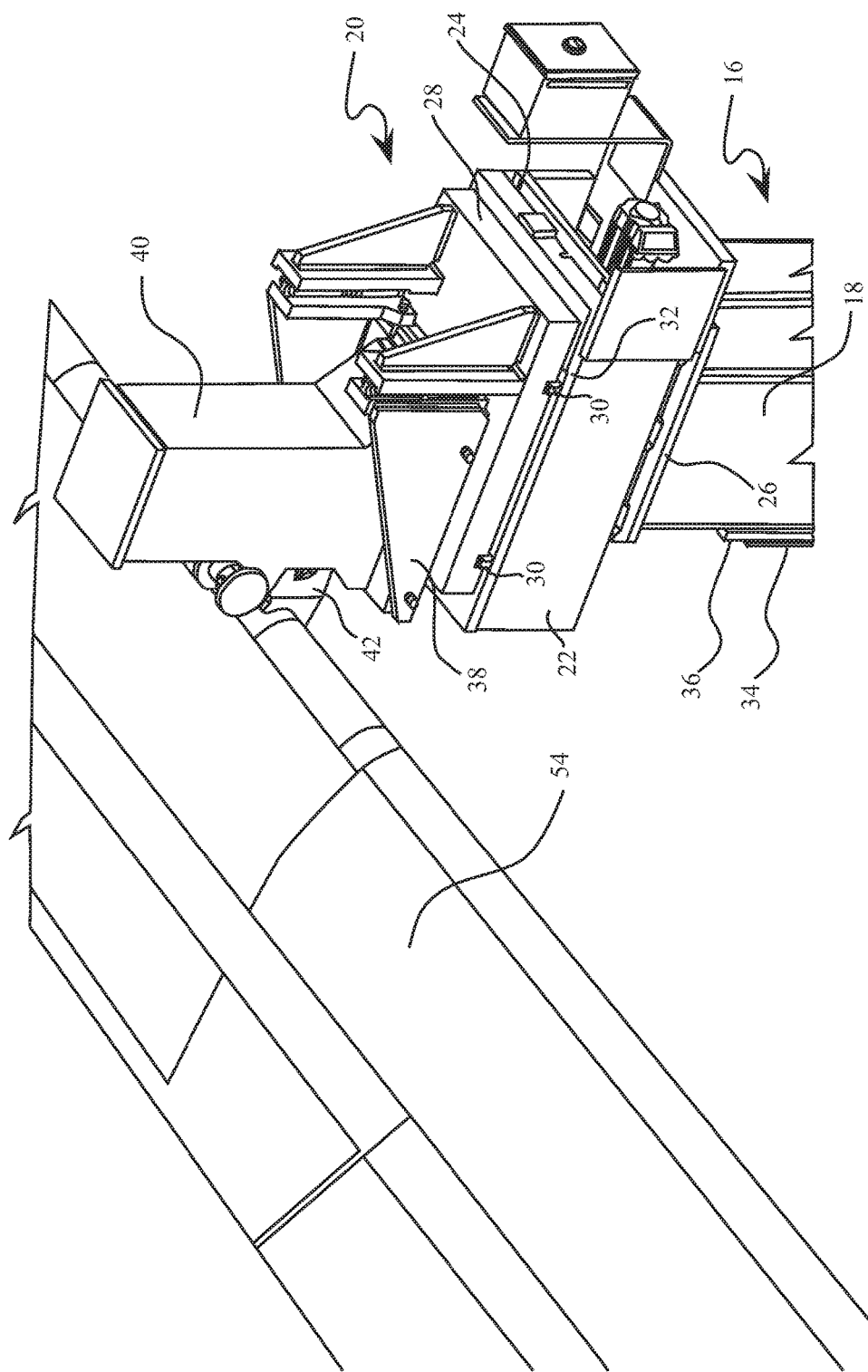
FIG. 2 is a detailed view of an exemplary Multi-Axis Positioning system (MAPS) element.

Referring to the drawings, FIG. 1 is a pictorial representation of an exemplary embodiment for wing assembly showing a first position 10, second position 12 and third position 14 for horizontal wing structure assembly. In each position multi-axis positioning system (MAPS) elements 16 support the components and wing during the assembly process. As shown in detail in FIG. 2, each MAPS 16 incorporates a support pedestal 18. Pedestal length is determined by access requirements for the assembly steps at each position allowing over and under wing access in position 1 and under wing access in position 2. Pedestals in position 3 are suspended from above to allow even greater under wing access. A three axis motion assembly 20 is mounted to each pedestal. A longitudinal positioning drive 22 is mounted on tracks 24 on surface plate 26 on the pedestal. A lateral positioning drive 28 is mounted to tracks 30 on top plate 32 of the longitudinal position drive 22. A fixture receiver 40 is mounted to the support table. Positioning of the fixture receiver 40 in the x-axis is accomplished by the longitudinal positioning drive 22, in the y-axis by the lateral positioning drive 28. Servo motors associated with each track set provide motion of the drives in each axis.

Figure 3:
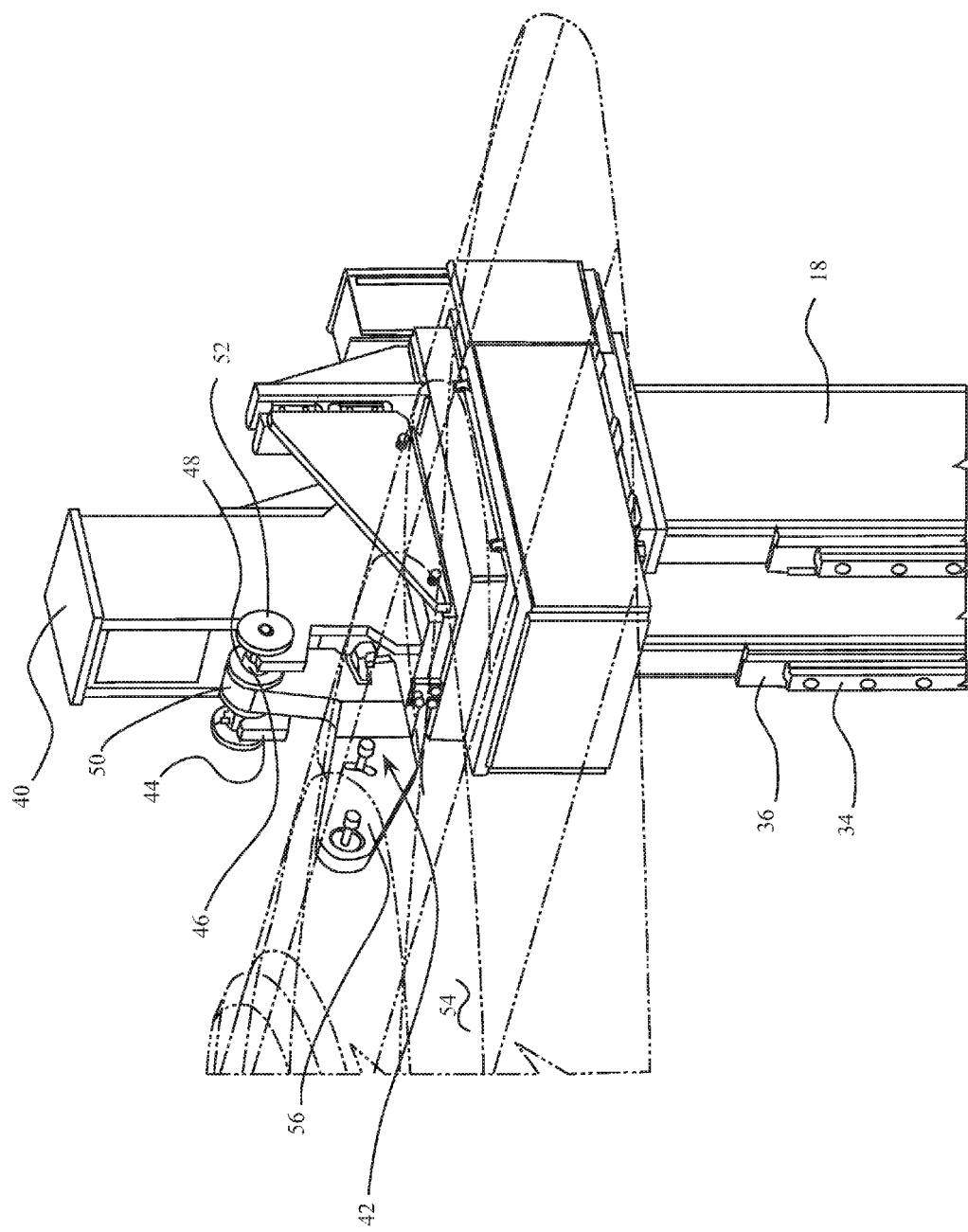
FIG. 3 is a detailed view of a Mechanical Equipment (ME) interface fitting for support of the fabricated structure by the MAPS elements.

The fixture receiver 40 on each MAPS provides an interface to support a mechanical equipment (ME) interface tool 42. For the embodiment shown in greater detail in FIG. 3, clevis hooks 44 on the fixture receiver 40 engage a horizontal support rod 46 received through bore 48 on an end boss 50 of the ME 42. Positioning plates 52 straddle the clevis hooks 44 for lateral stability in the fixture receiver. The rod 46 and positioning plates 52 in each ME provide for lateral and longitudinal self centering on the fixture receiver clevis hooks 44. Clamps engaged by the fixture receiver on the rod after engagement in the clevis hooks rigidly retain the ME and thus the supported wing structure to preclude uplift forces from the lower panel load and automated fastening operations from inducing vertical wing structure movement. Multiple MEs having standard end boss interfaces for the MAPS fixture receivers support the wing structure 54 as shown in the drawings. Each ME has a body 56 adapted for attachment to specific attach features in an associated component or portion of the wing structure. Vertical tracks 34 are supported within mating runners 36 on the MAPS support pedestals 18 for vertical positioning.

Returning to FIG. 1, forward MAPS of position 1 engage MEs attached to a front spar 60 by appropriate 3-axis positioning of each MAP. The front spar is then held rigidly by the MAPS in all three axes in a wing reference frame. A rear spar 62 having attached MEs is engaged by the aft MAPS of position 1 and positioned in the z-axis of the wing reference frame. Ribs 63 are then assembled to the front spar 60. Mating determinant assembly (DA) reference holes in the ribs 63 and rear spar 62 are then aligned by manipulation of the aft MAPS in the longitudinal axis and the ribs are then mounted to the rear spar forming a ladder structure.

As components are added to the wing assembly potentially resulting in deflection of the components and tooling due to the added mass, a planar locating laser 65 positioned below the wing at front and rear spar locations is employed to located defined reference points on the structure as defined in application Ser. No. 12/550,666 filed on Aug. 31, 2009 now U.S. Pat. No. 8,539,658 entitled Autonomous Carrier For Continuously Moving Wing Assembly Line having a common assignee with the present application the disclosure of which is incorporated herein by reference.

The MAPS 16 are then adjusted to compensate for the deflection to allow accurate assembly of subsequent components in the structure. The laser locating process is employed multiple times to assure continued conformity to the wing reference frame. Determinant assembly using the motion capability of the MAPS precludes the need for massive and expensive rigid tooling to maintain.

Figure 4:
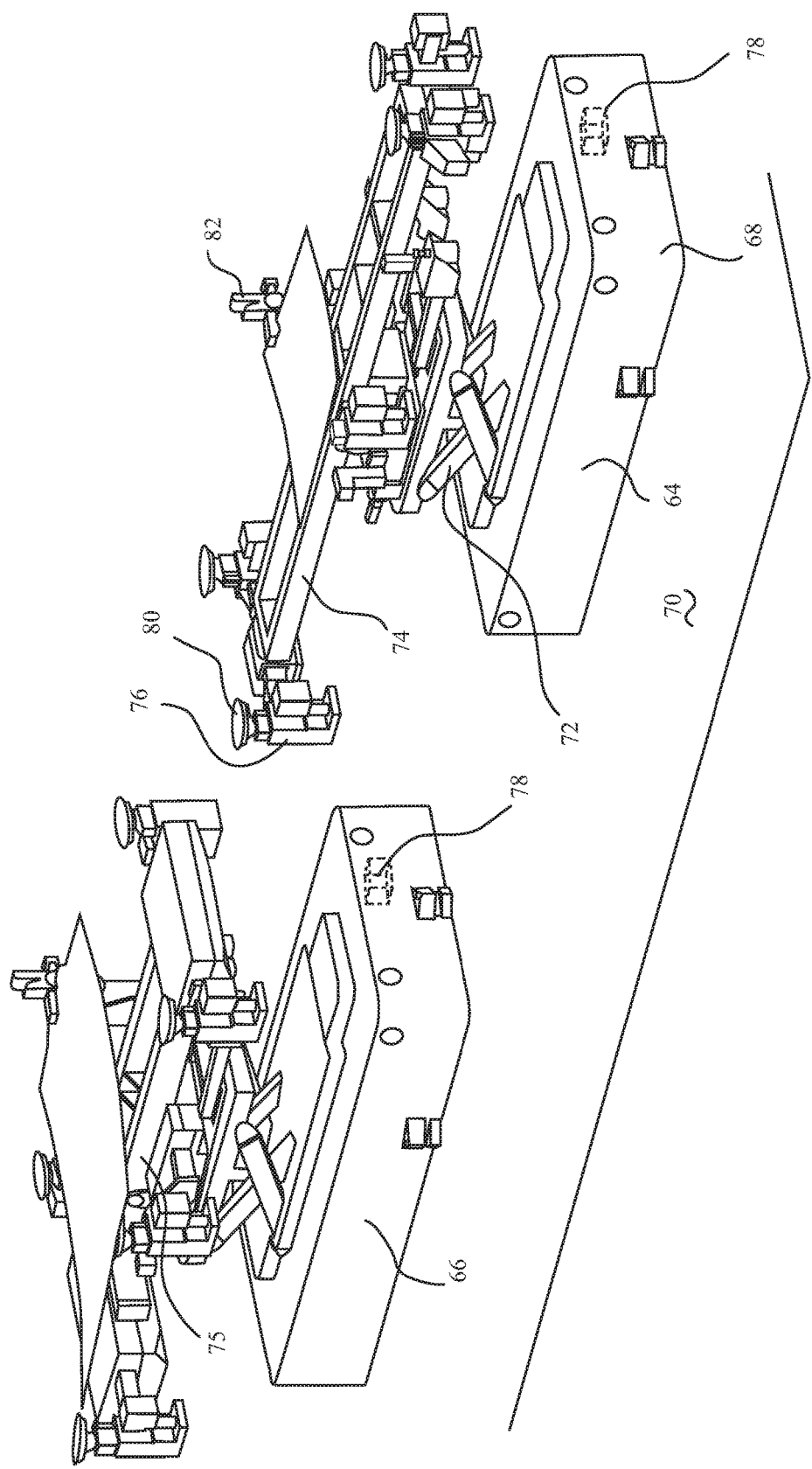
FIG. 4 is a detailed view of a pair of Automated Ground Vehicles (AGV) integrated into the system for movement of fabricated structures between positions.

Upon completion of assembly steps in position 1 at the defined takt time, a pair of Automated Guide Vehicles (AGV) 64, 66, shown in FIG. 4, are employed for movement of the partially assembled wing structure to position 2 (for both the right and left wing assembly lines). Each AGV has a wheeled base 68 for lateral and longitudinal positioning on the assembly floor 70. A scissors elevation mechanism 72 provides gross vertical positioning of an attached support header 74, 75. For the embodiment shown, the AGV base and scissor mechanisms are identical and have a standard interface to the support header allowing interchangeability. A spare AGV can be swapped with any of the four AGVs in the event of a failure. Four support headers dedicated for inner and outer wing assembly portions of left and right hand wing assemblies are mountable to the AGVs. The support headers 74, 75 attached to the AGVs of FIG. 4 have two axes of motion for each support point mechanism 76 (X—side to side for panel width and Z—vertical), which are NC programmable and controlled by an onboard processor system 78 on each AGV.

Each support point mechanism 76 employs a vacuum chuck support pad 80 to support the wing structure elements at various handling points as described. Each header incorporates a trunion fitting 82 for rotating and placing the wing lower skin from an overhead crane to the headers. The support point mechanisms in each header and the fixture receivers in the MAPS incorporate load cells for determining weight bearing of the wing structure by the MAPS or the AGVs during transfer. As the wing assembly is lowered by the MAPS load cells in both the AGVs and the fixture receivers verify that the wing load has been transferred to the fixture before the AGVs retract and move away from the wing to return to their parking position. The load cells are also used to verify that the AGV has received the wing structure from the fixture receivers before it begins the transfer to the next assembly position/fixture.

Figure 5:
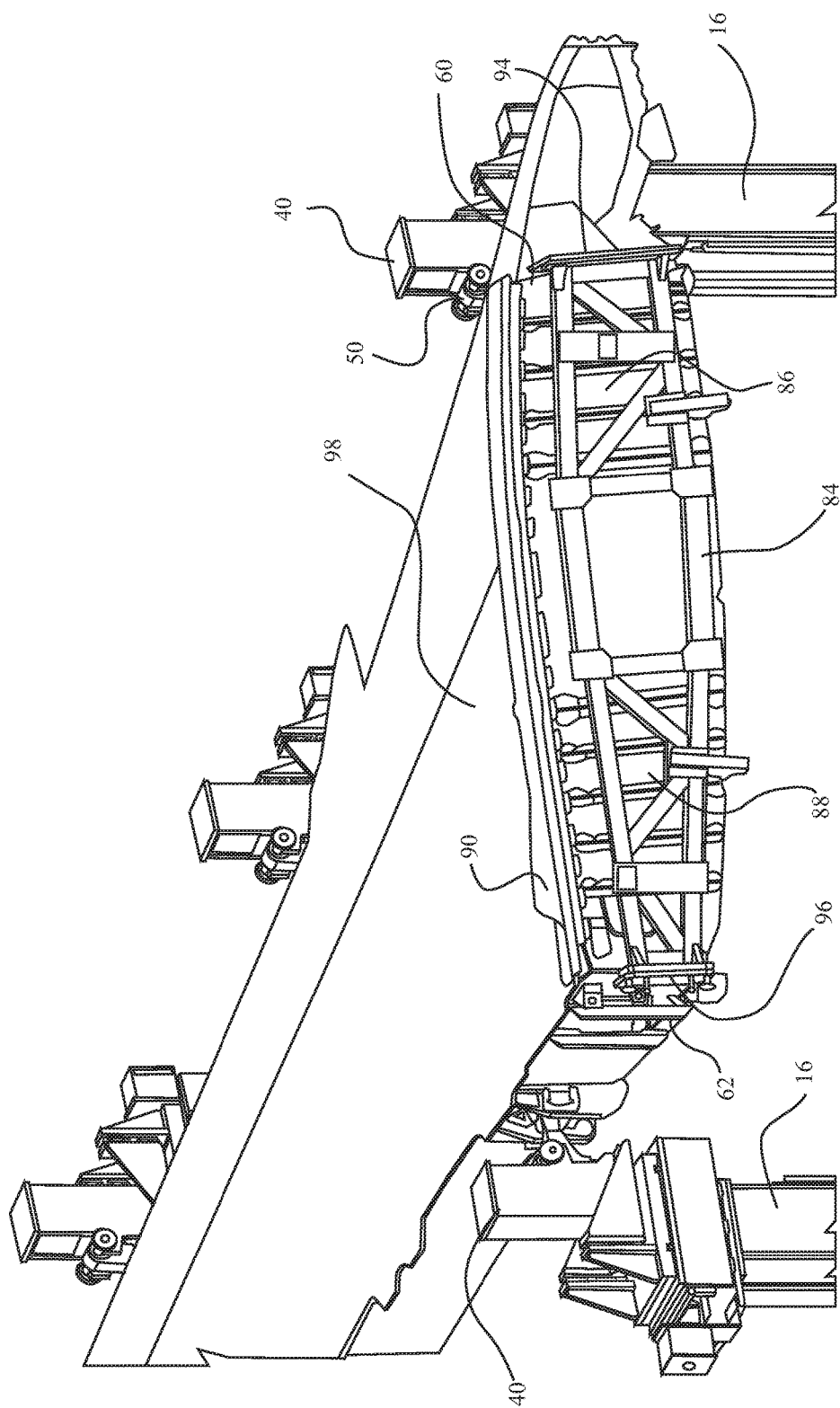
FIG. 5 is a detailed view of the fabricated wing structure in position 2 with addition of a wing side of body geometry truss tool.
Figure 6:
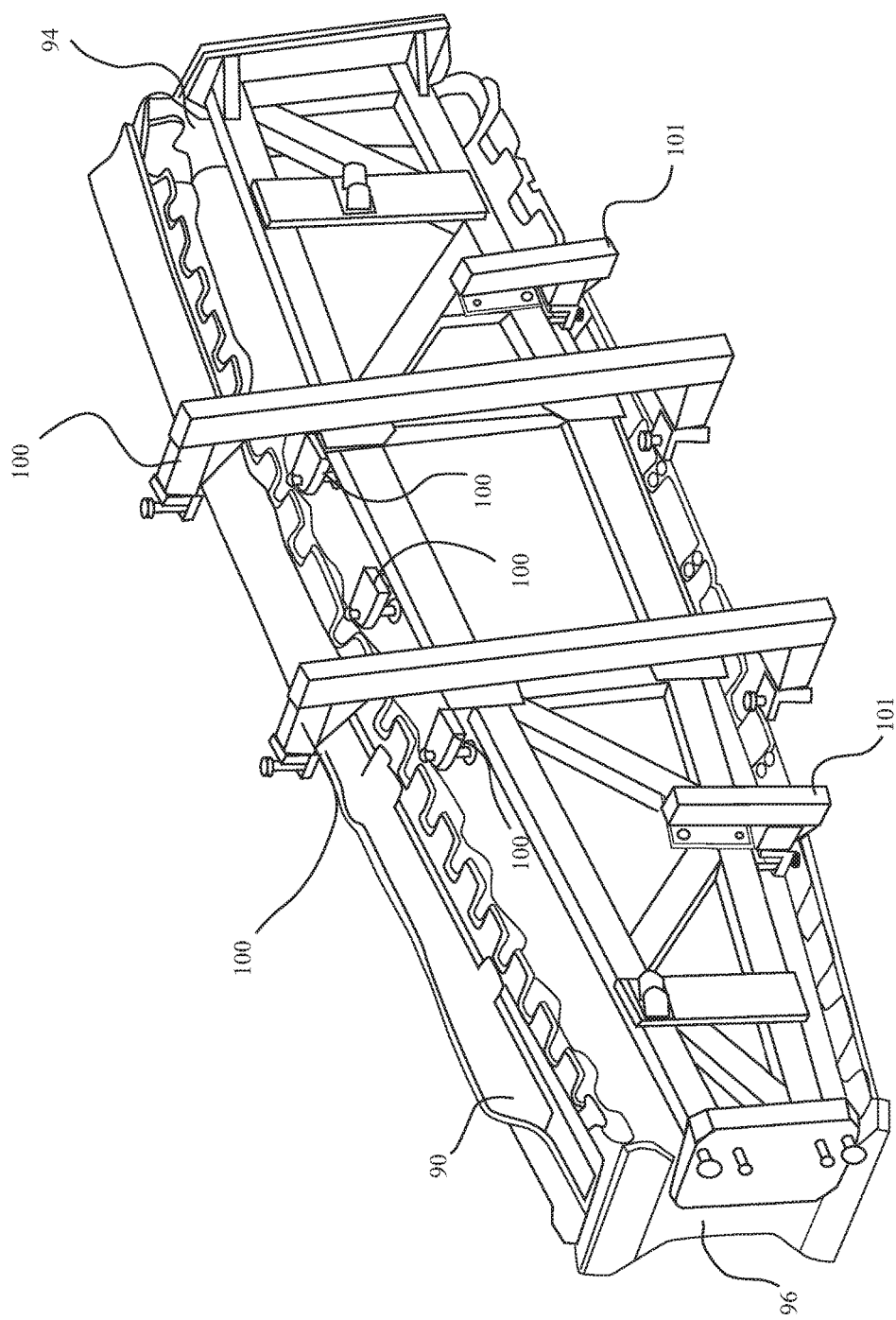
FIG. 6 is a detailed view isometric view of the truss tool.
Figure 7:
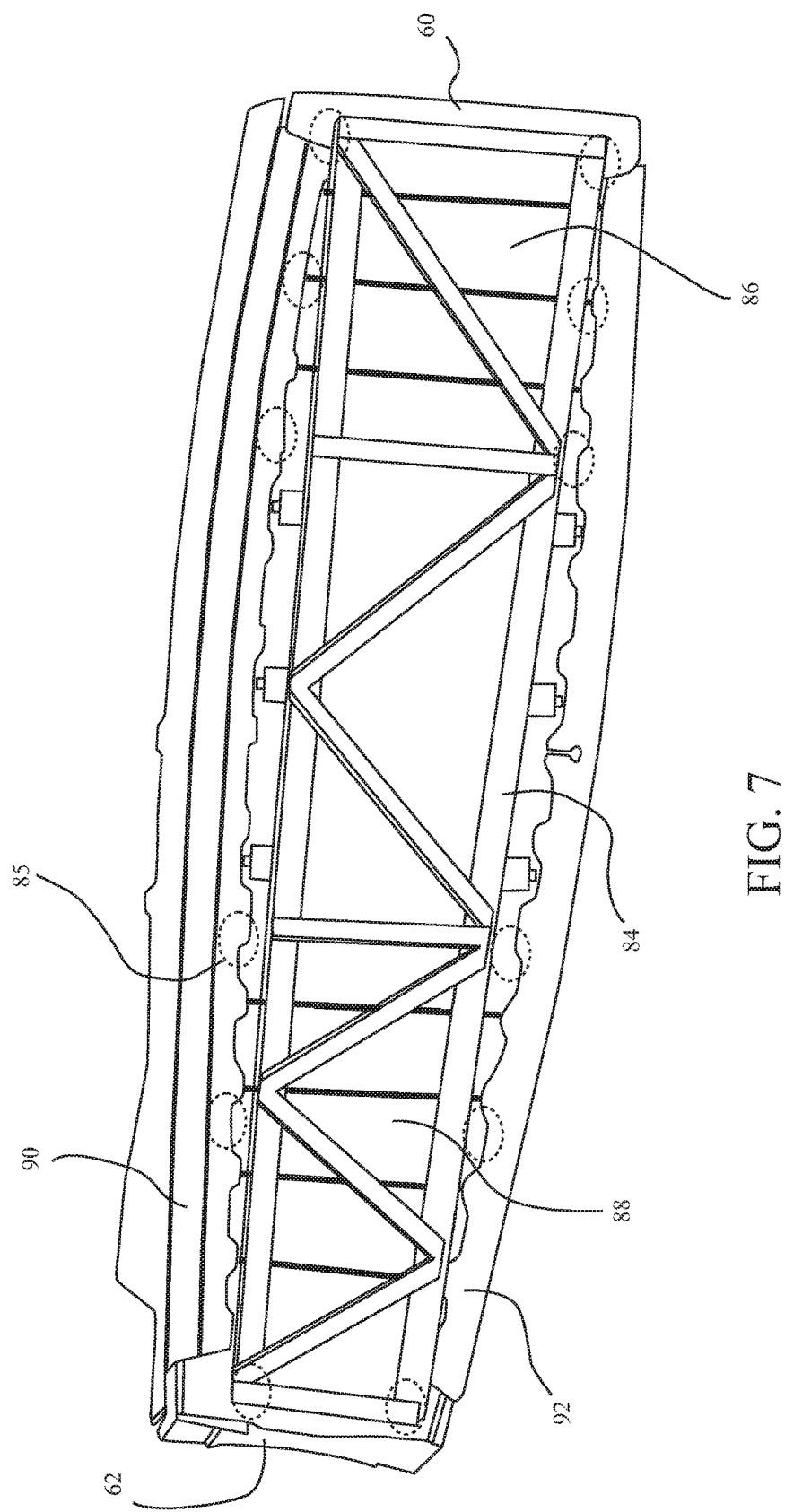
FIG. 7 is a detailed side view of the truss tool demonstrating determinant assembly (DA) location holes.

FIG. 5 shows the wing structure assembly in Position 2 as supported by the MAPS 16. The pedestals 18 which support the 3 Axis motion assemblies 20 are higher for position 2 allowing easy access to the underside of the wing structure for operations to be performed in position 2. A wing side of body geometry tool 84 has been installed as a dummy rib to accurately locate the front spar 60 and rear spar 62 with determinant assembly holes (generally designated 85) in the forward web 86 and aft web 88 common to the spar terminal fittings and the upper and lower panel chords 90 and 92 to accurately control the contour of the side of body chord profiles as shown in detail in FIGS. 6 and 7. After the spars 60, 62 are loaded into the assembly position 1 as previously described, the side of body tool 84 is pinned to the spar terminal fittings 94, 96. After the upper panel 98 is loaded, the forward and aft webs 86 and 88 are loaded and pinned to the DA holes in the terminal fittings. The upper panel chord 90 is flexed up or down by pushers 100 mounted on the applied tool until the DA holes in the webs and chords are aligned, then temporary fasteners are installed. The small size of this applied tool 84 allows the AGVs access to move the wing structure from position to position as well as allowing automated fastening equipment full access to the panels.

Figure 8:
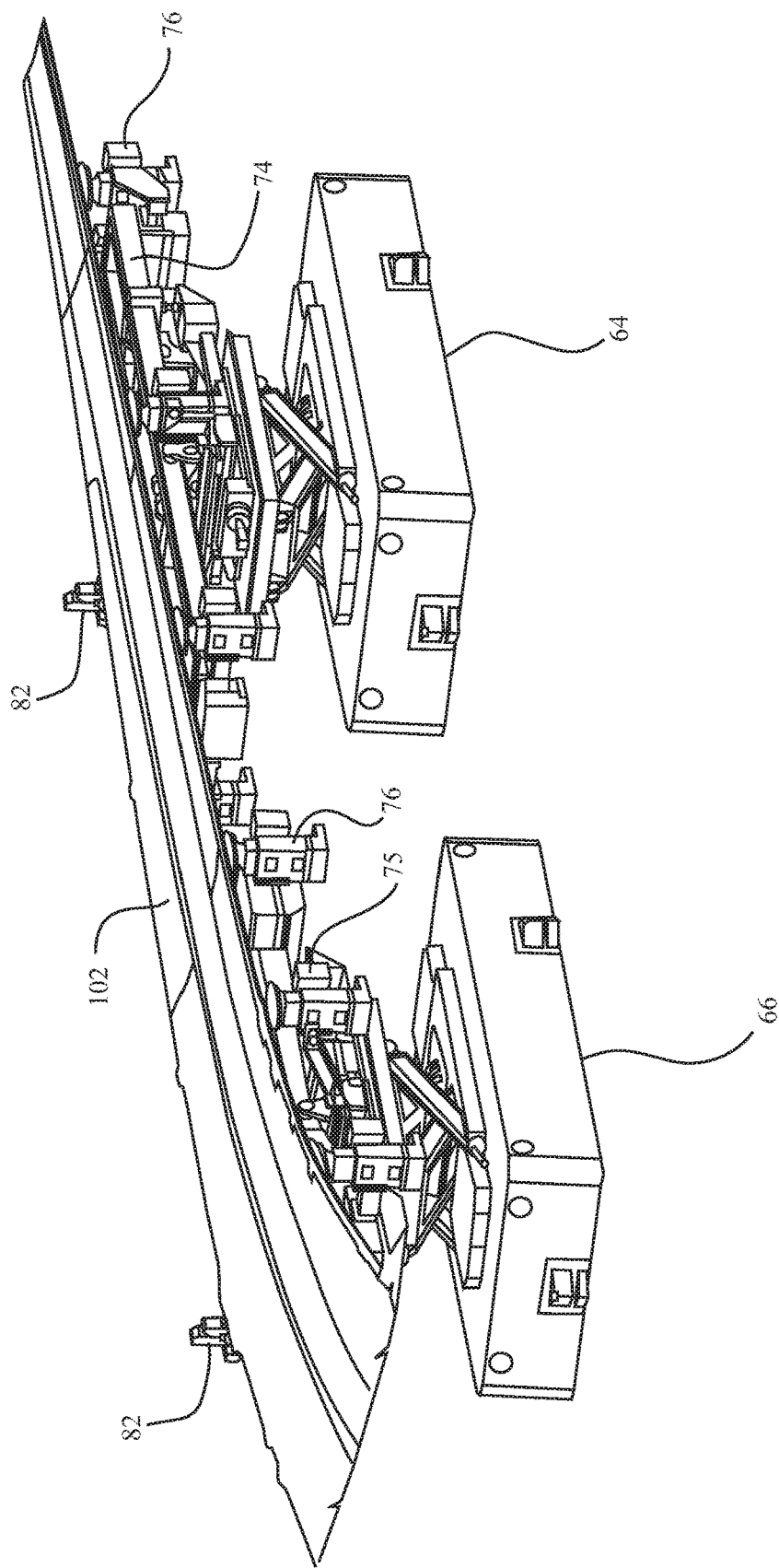
FIG. 8 is a detailed isometric view of the AGV pair supporting a lower skin panel for assembly into the wing structure at position 2.

FIG. 8 shows the lower skin panel 102 loaded on the headers of the AGVs for installation into the wing structure assembly in position 2. Upon loading of the lower skin panel, the location of the AGVs is indexed and installation of the lower skin is accomplished by synchronous positioning of the AGV pair to precisely locate underneath the wing structure as supported by the MAPS in Position 2. The lower skin is then raised by vertical motion of the AGV scissors and lateral motion by the header support point mechanisms to achieve a preset position with respect to the wing structure. Measurements are then taken manually to confirm the position and fine positioning of the AGVs and headers responsive to the measurements are then made. The combined headers and the AGVs then accomplish a synchronized multi-axis coordinated motion to insert the lower skin into position on the wing structure aligning DA holes in the lower skin panel with spar fitting points. During lower skin panel loading the load cells in the support point mechanisms monitor the press up forces of the panel to the main wing box structure to assure that excessive forces are not used. Force limits are programmable and if exceeded will set off audible and visual alarms as well as stop the motion of the AGVs and associated fixtures. After positioning, the lower skin panel is flexed using the pushers 101 of the wing side of body tool 84 until DA holes in the forward and aft web 86, 88 are aligned with corresponding DA holes in the lower panel cord 92 to set the contour. The lower wing panel is then sealed, permanent tack fasteners are installed, and the wing structure is ready for movement to Position 3.

Figure 9:
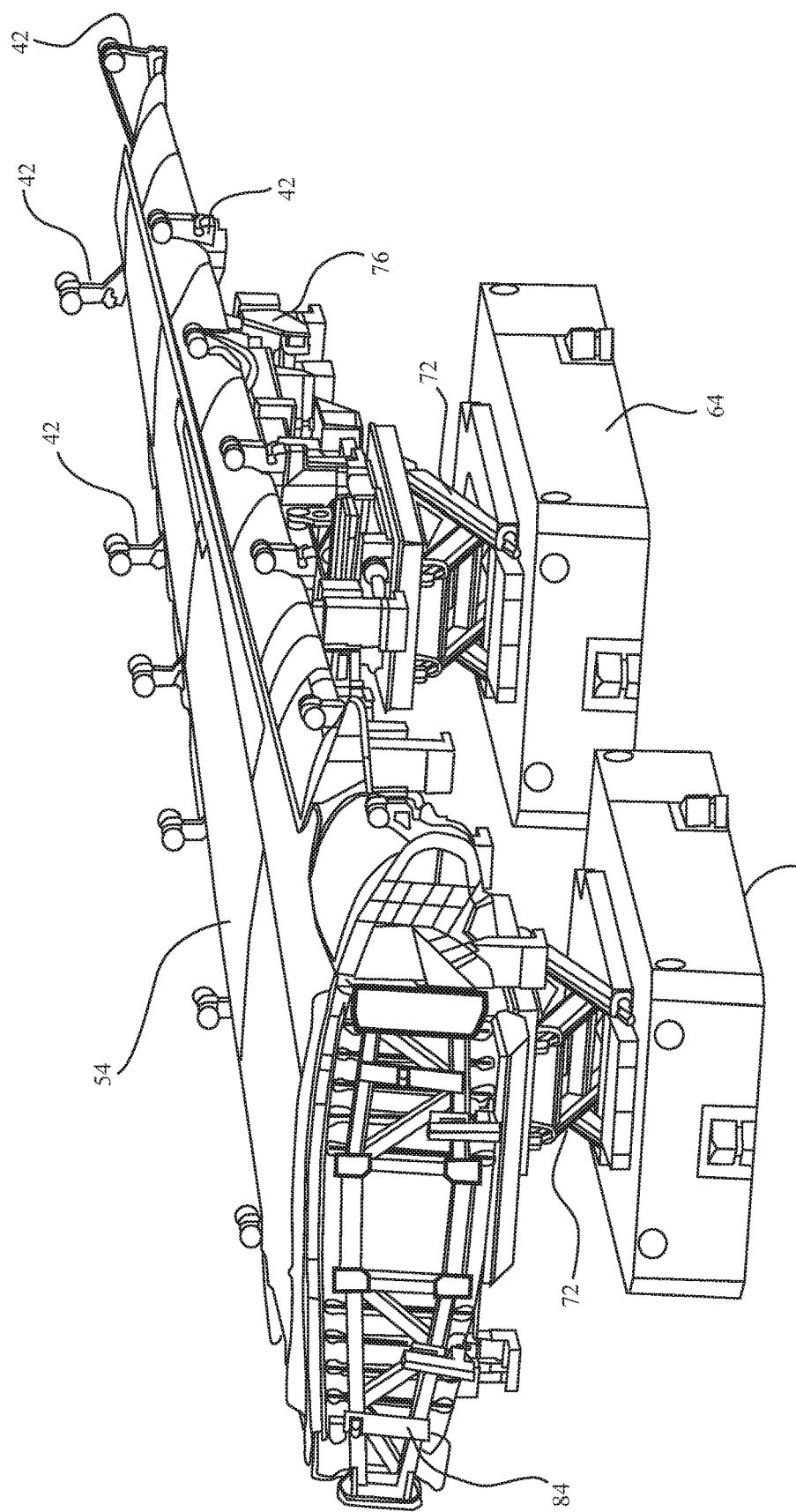
FIG. 9 is a detailed isometric view of the AGV pair transporting the fabricated wing structure from position 2 to position 3.
Figure 10:
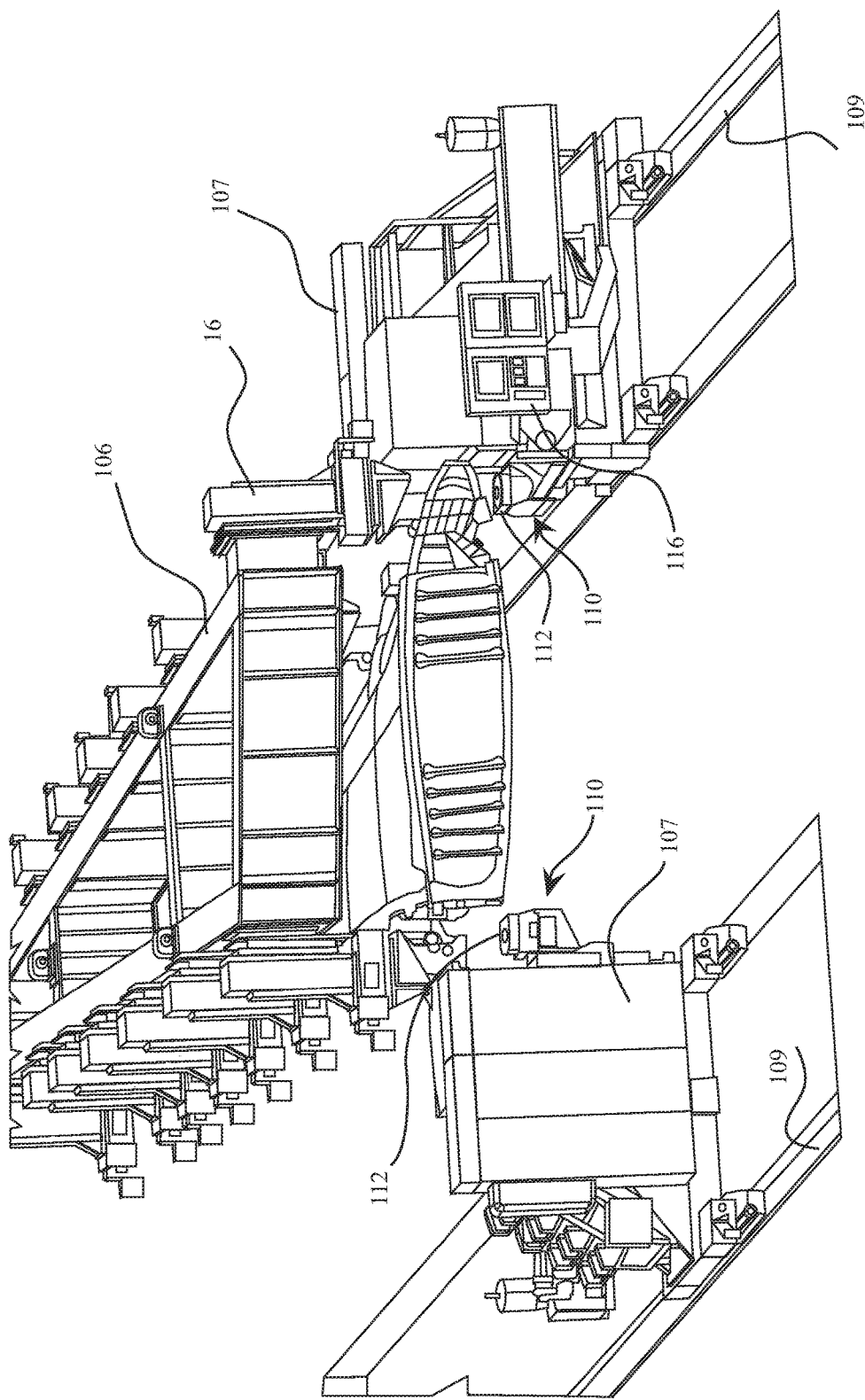
FIG. 10 is a perspective view of the fabricated wing structure as supported by the MAPS suspended from the gantry elements of the Floor Mounted Universal Holding Fixture (FUHF) in position 3 with exemplary location of Automated Wing Fastener Installation Systems (AWFIS)
Figure 11:
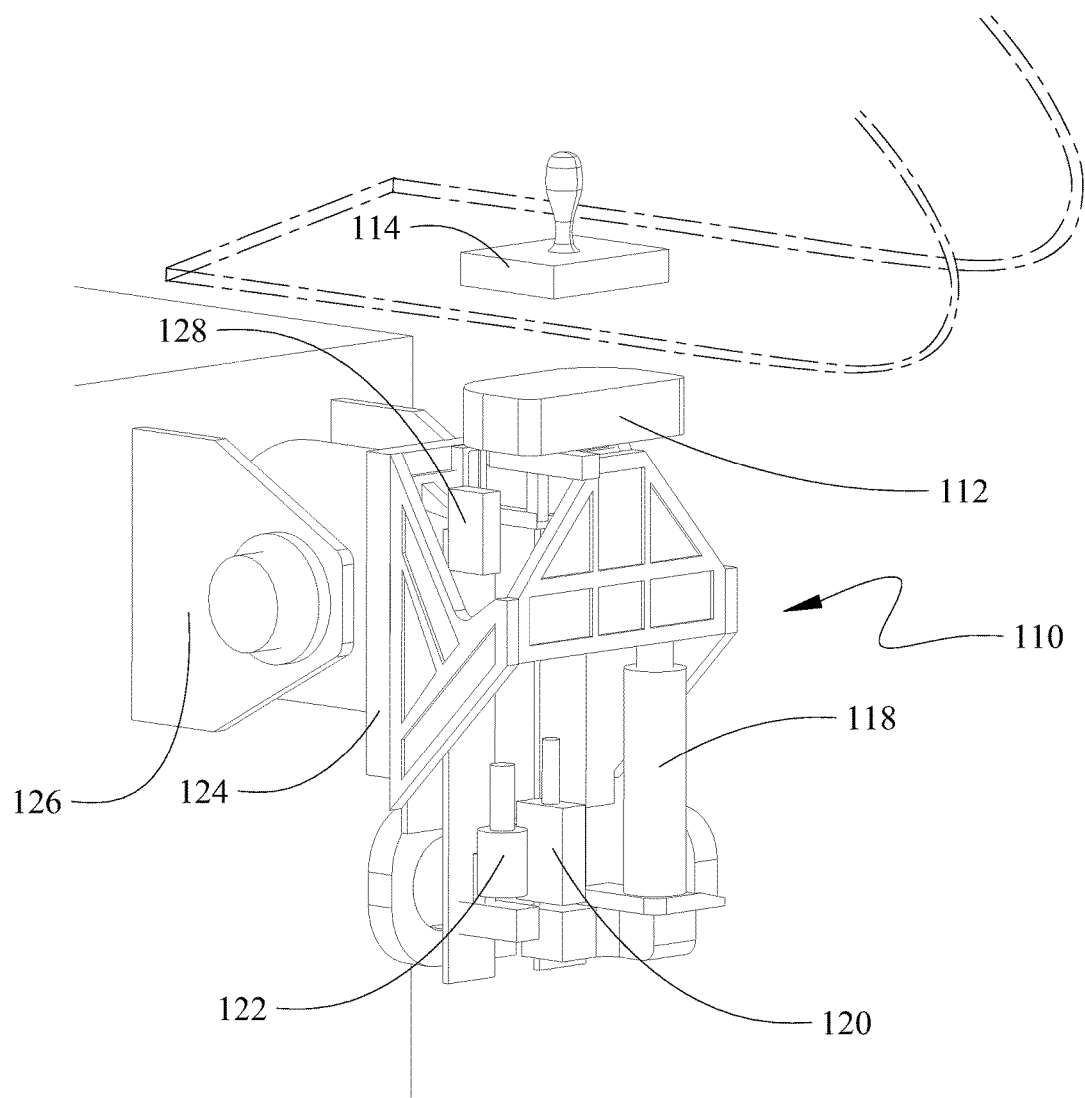
FIG. 11 is a perspective view of the attachment head of the AWFIS engaging the wing structure with the steel backing plate for clamping.

FIG. 9 shows the assembled wing structure after retrieval from the Position 2 MAPS by the AGVs. The AGVs then synchronously transport the wing structure to position 3. In position 3, as shown in FIG. 10, MAPS 16 are supported by a positioning truss 106 which is carried by the Floor Mounted Universal Holding Fixture (FUHF) 108 (shown in FIG. 1). MAPS 16 structure for position 3 is identical to that previously described, however, the structure is inverted to allow clearance underneath the supported wing structure for assembly operations. In position 3 multiple Automated Wing Fastener Installation Systems (AWFIS) 107 operating on positioning guideways 109 are used to electromagnetically clamp-up the lower wing panel to spar or ribs, drill and countersink, install sealant and insert interference fit bolts. As shown in FIG. 11, the automated fastening head 110 contacts the surface of the lower wing panel from the outside of the wing structure and applies upward force in conjunction with the electromagnet 112 that is energized and creates an electromagnetic field that pulls a steel backing plate 114 from the inside of the wing to provide sufficient clamping force to close any gaps between the structure to allow the head to conduct fastener installation operations on the lower wing panel for connection to ribs and spars. Each AFWIS incorporates an operator control panel 116 which provides for programming input of automated tasks and manual control for non-automated tasks. As shown in FIG. 11 as an exemplary embodiment, the head incorporates multiple fastener installation systems including a drill spindle 118, hole inspection probe 120 and bolt inserter 122, each having a fine positioning mechanism for displacement for multiple operations in a single clamping position of the head. Gross positioning of the head is accomplished with three dimensional actuators affixed from the carrying plate 124 of the head and the AFWIS body 126. A resync camera 128 is provided for location of the permanent tack fasteners, which are used as a reference system to locate the remaining fastener placement. Placement of the head 110 is accomplished and the electromagnet 112 is activated to secure the surface for operations between the electromagnet and backing plate 114. The fastener installation systems are then manipulated to drill, locate holes and insert bolts or other fasteners automatically with the structure firmly clamped. While two AWFIS machines are shown in the drawings, up to four AWFIS machines can work on each wing concurrently while still allowing mechanics to work in parallel due to safe stay out zones.

Once the assembly operations are complete for position 3 the wing structure is canted dihedrally by the MAPS and lowered onto a transfer dolly. The transfer dolly then pulses to the next assembly position for the aircraft.

Figure 12A:
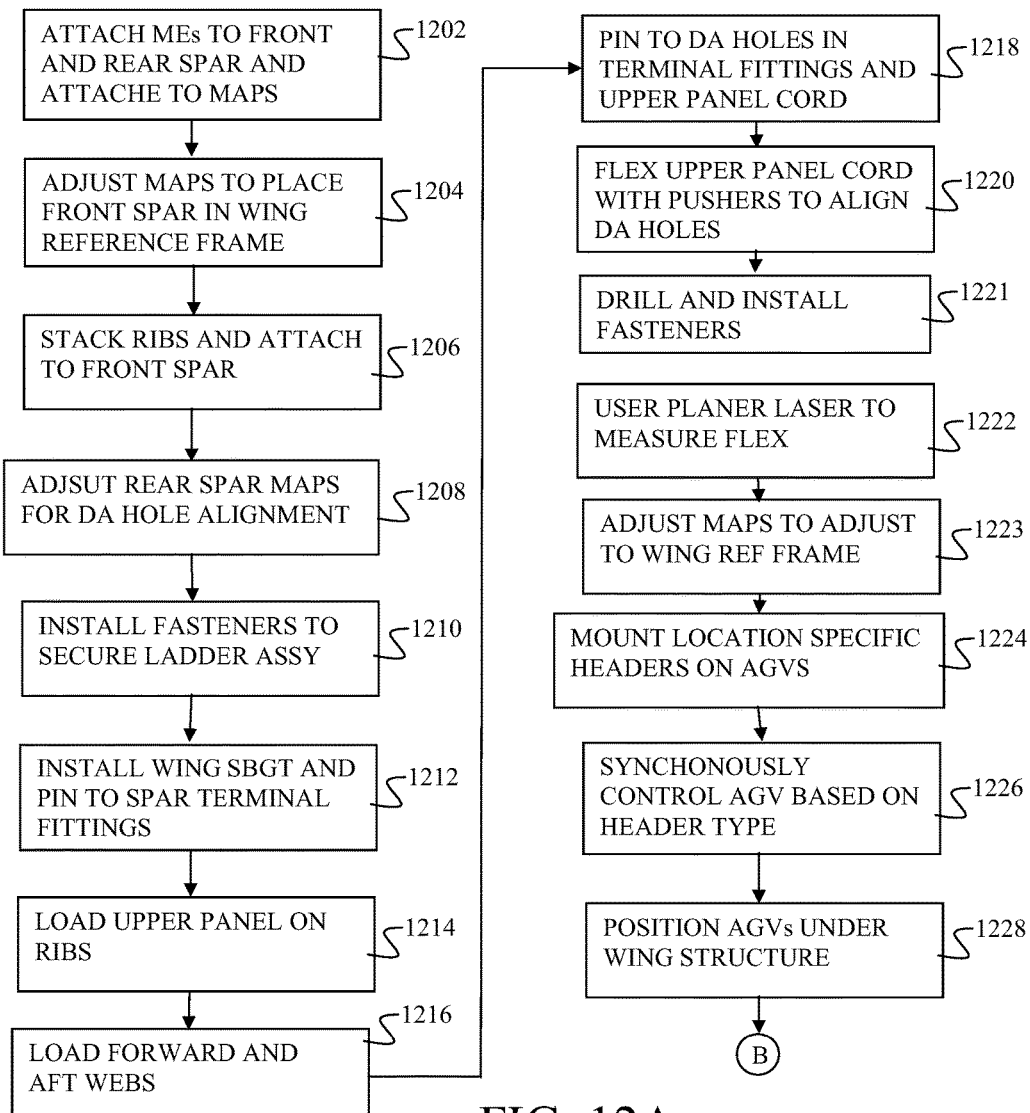
FIGS. 12A-12C are a flow chart of the operational sequence in the pulsing assembly line.
Figure 12B:
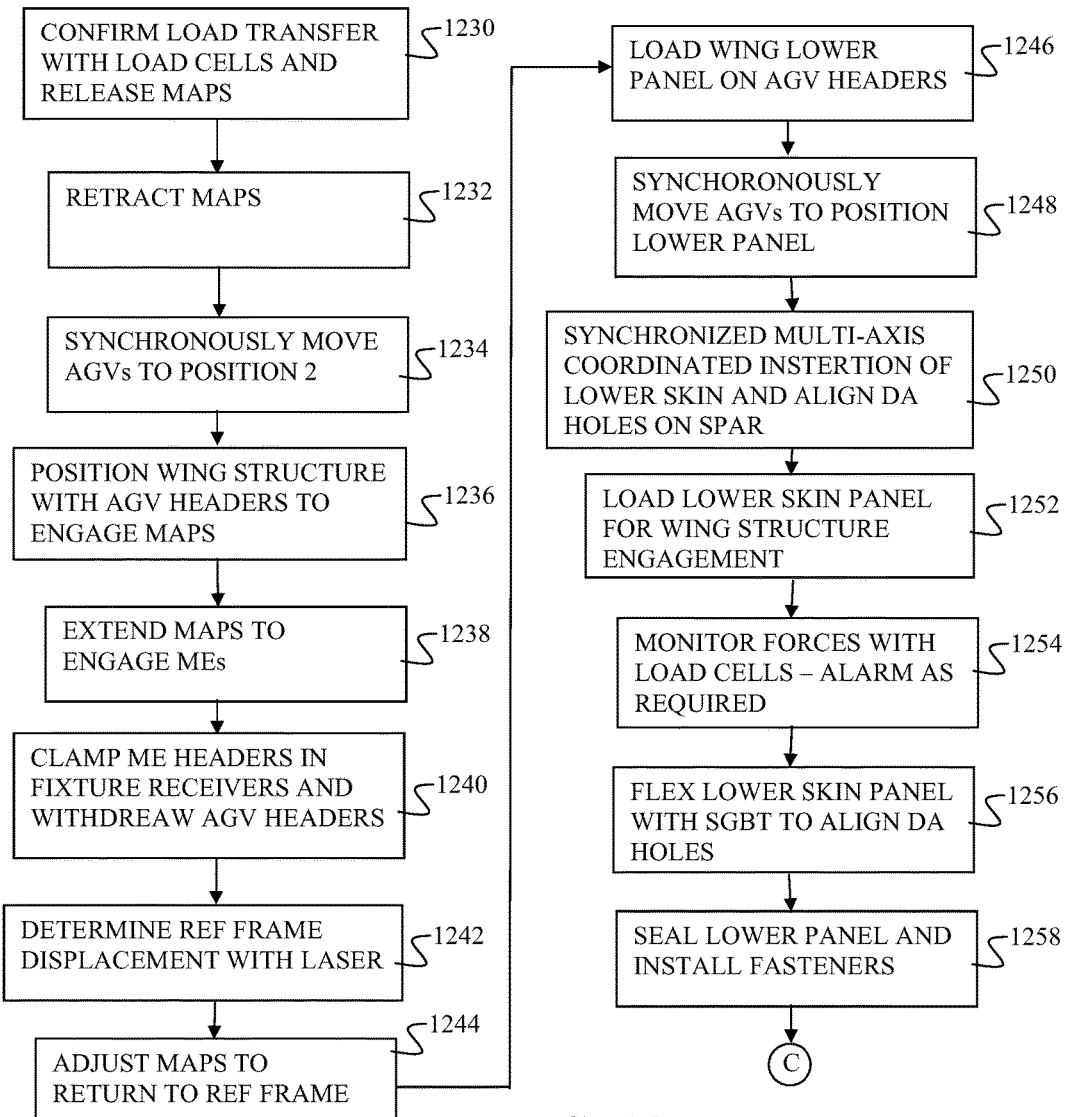
Figure 12C:
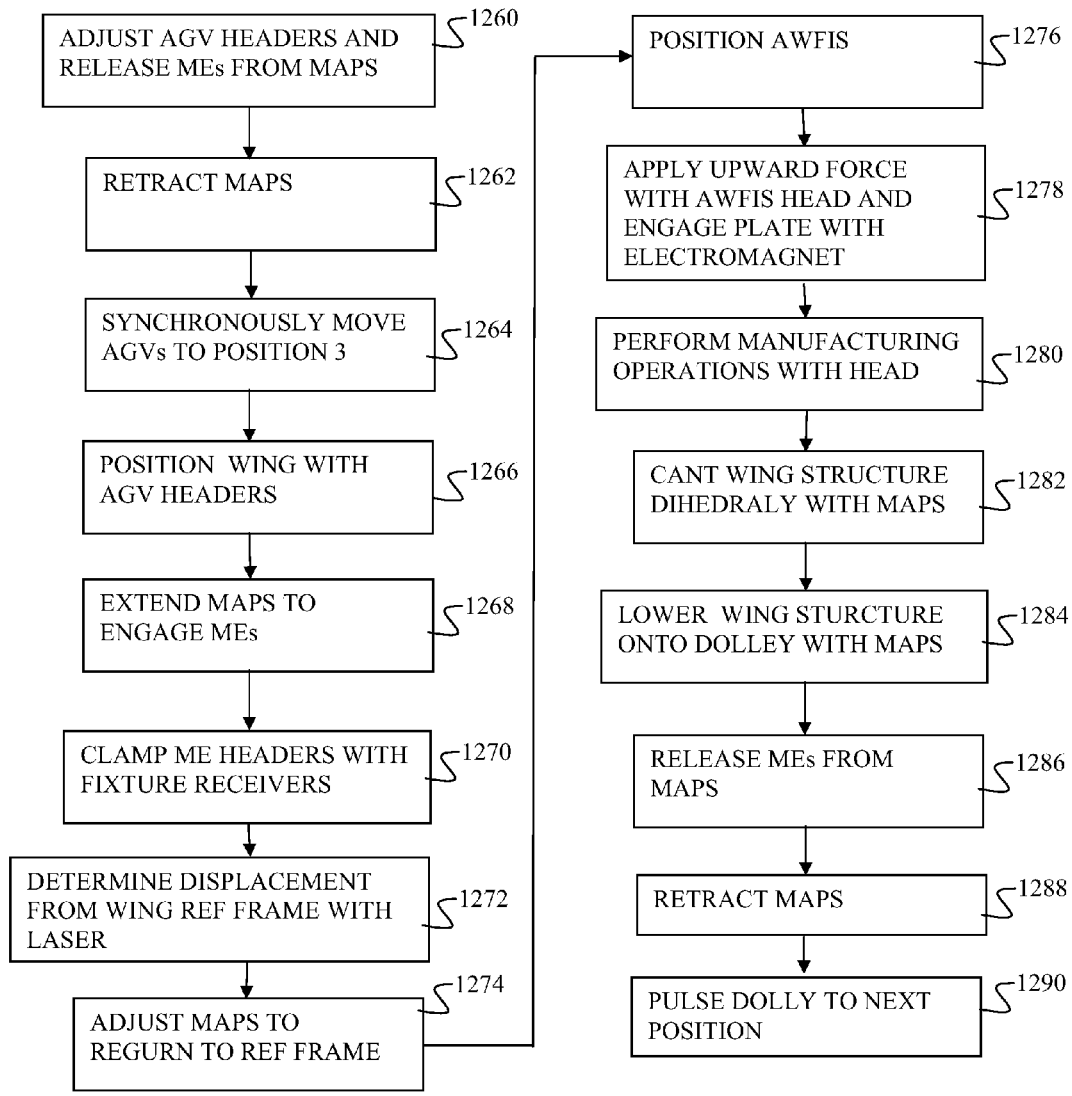

As represented in FIGS. 12A-12C, the operational method employing the disclosed embodiments commences in position 1 wherein a front spar with attached MEs and a rear spar with attached MEs are loaded onto the front and rear MAPS of position 1, step 1202. The MAPS supporting the front spar are adjusted in 3 axes to place the front spar in a wing reference frame, step 1204. The ribs are then loaded on the front and rear spars and attached to the front spar, step 1206. The MAPS supporting the rear spar are adjusted to align determinant assembly (DA) holes in the ribs and rear spar for proper positioning in the wing reference frame, step 1208. Fasteners are then installed to secure the ladder assembly of the wing structure, step 1210. A wing side of body geometry tool (SBGT) is installed as a dummy rib and pinned to the spar terminal fittings, step 1212. The upper panel is loaded onto the ribs, step 1214, and the forward and aft webs are loaded, step 1216 and pinned to the DA holes in the terminal fittings and upper panel chord, step 1218. The upper panel chord is flexed up or down by pushers mounted on the applied tool until the DA holes in the webs and chords are aligned, step 1220, and temporary fasteners are installed in the side of body webs and, fasteners are installed in the upper panel common to the spars and ribs via manual or automated methods, step 1221. At predetermined assembly points, a planar laser determines relative displacement from the wing reference frame of defined measurement points on the wing assembly due to flexing of the assembly and tooling resulting from addition of mass to the assembly, step 1222. The MAPS 3-axis motion assemblies are then adjusted to bring the measurement points back into wing reference frame position, step 1223.

Identical AGVs have location specific headers mounted for inner and outer wing structure support with left and right wing designations, step 1224. The AGV computer control systems sense the header type and synchronously control the AGV based on header type, step 1226. The AGVs position under the wing structure as supported in the MAPS of position 1, the headers, with point support mechanisms controllable in multiple axes are raised to engaged the wing structure, step 1228. When the load cells in the point support mechanisms and fixture receivers confirm that load of the wing structure is being borne by the AGV headers, the MEs are released from the MAPS in position 1, step 1230, the MAPS 3-axis motion assemblies retract, step 1232 and the AGVs synchronously move the wing structure to position 2, step 1234. The headers on the AGVs position the wing structure for engagement of the MEs with the fixture receivers of the MAPS in position 2, step 1236. The MAPS 3-axis motion assemblies in position 2 extend to engage the ME headers with the fixture receivers, step 1238. The fixture receivers clamp the ME headers and the AGV headers are withdrawn, step 1240. The planar laser determines relative displacement from the wing reference frame of defined measurement points on the wing assembly, step 1242. The MAPS 3-axis motion assemblies are then adjusted to bring the measurement points back into wing reference frame position, step 1244.

The lower wing panel is loaded onto the headers of the AGV pair, step 1246 and the AGVs synchronously move to position the lower wing panel under the wing structure supported in the MAPS of position 2, step 1248. The combined headers and the AGVs then accomplish a synchronized multi-axis coordinated motion to insert the lower skin into position on the wing structure aligning DA holes in the lower skin panel with spar attachment points, step 1250. The lower skin panel is then loaded using the support point mechanisms for firm engagement with the wing structure, step 1252. Monitoring of press up forces of the panel to the main wing box structure is accomplished using the load cells to assure that excessive forces are not used and if force limits are exceeded set off audible and visual alarms and stop the motion of the AGVs and associated fixtures 1254. The lower skin panel is flexed using the pushers on the wing side of body tool until DA holes in the forward and aft web are aligned with corresponding DA holes in the lower panel cord to set the contour, step 1256. The lower wing panel is then sealed and permanent tack fasteners are installed, step 1258.

The AGV headers are then adjusted and the MEs are released from the MAPS in position 2, step 1260, the MAPS 3-axis motion assemblies retract, step 1262 and the AGVs synchronously move the wing structure to position 3, step 1264. The headers on the AGVs position the wing structure for engagement of the MEs with the fixture receivers of the MAPS in position 3, step 1266. The MAPS 3-axis motion assemblies in position 3 extend to engage the ME headers with the fixture receivers, step 1268. The fixture receivers clamp the ME headers and the AGV headers are withdrawn, step 1270. The planar laser determines relative displacement from the wing reference frame of defined measurement points on the wing assembly, step 1272. The MAPS 3-axis motion assemblies are then adjusted to bring the measurement points back into wing reference frame position, step 1274.

Multiple Automated Wing Fastener Installation Systems (AWFIS) are brought into operating position on positioning guideways, step 1276. The automated fastening head contacts the surface of the lower wing panel from the outside of the wing structure and applies upward force in conjunction with the electromagnet that is energized and creates an electromagnetic field that pulls a steel backing plate from the inside of the wing to provide sufficient clamping force to close any gaps between the structure, step 1278. The head drills, countersinks, applies sealant and inserts bolts into the lower wing panel and ribs or spars, step 1280. Once the assembly operations are complete for position 3 the wing structure is canted dihedrally with the Position 3 MAPS, step 1282 and lowered onto a transfer dolly, step 1284. The MEs are released from the MAPS in position 3, step 1286, the MAPS 3-axis motion assemblies retract, step 1288. The transfer dolly then pulses to the next assembly position for the aircraft, step 1290.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A single piece pulsed flow wing assembly method providing for horizontal wing manufacture, the method comprising:
    moving and locating a wing structure in a plurality of assembly positions using synchronized automated guided vehicles (AGVs) guided in a predetermined manner;
    supporting and indexing components in the wing structure using multi-axis assembly positioning systems (MAPS) at each assembly position, wherein indexing the components uses using determinant assembly techniques; and
    using modular automated manufacturing processes employing magnetic assembly clamping, drilling, fastener insertion, and sealant application.

2. The single piece pulsed flow wing assembly method of claim 1 wherein using synchronized automated guided vehicles comprises:
    mounting location-specific headers on identical AGVs for inner and outer wing structure support with left and right wing designations;
    sensing a header type of the location specific header and synchronously controlling the AGV based on the header type;
    positioning two AGVs with inner and outer wing structure support under the wing structure as supported in the MAPS in a first position;

raising the headers with point support mechanisms controllable in multiple axes to engaged the wing structure;
releasing the mechanical equipment interface fittings (MEs) from the MAPS in the first position;
retracting the MAPS; and
synchronously moving the AGVs supporting the wing structure to a next assembly position.

3. The single piece pulsed flow wing assembly method of claim 2 wherein the step of using multi-axis assembly positioning systems comprises:
loading a front spar with attached mechanical equipment interface fittings (MEs) and a rear spar with attached MEs onto front and rear MAPS of a first assembly position;
adjusting the MAPS supporting the front spar in 3 axes to place the front spar in a wing reference frame;
loading ribs on the front and rear spars; and
attaching the ribs to the front spar;
and wherein the step of using determinant assembly techniques includes adjusting the MAPS supporting the rear spar to align determinant assembly (DA) holes in the ribs and rear spar for proper positioning in the wing reference frame.

4. The single piece pulsed flow wing assembly method of claim 3 further comprising:
installing fasteners to secure the ribs to the rear spar forming the wing structure at predetermined assembly points;
determining, with a planar laser, relative displacement from the wing reference frame of defined measurement points on the wing structure due to flexing of the wing structure and tooling resulting from addition of mass to the wing structure; and
adjusting the MAPS by appropriate 3-axis positioning to bring the measurement points back into wing reference frame position.

5. The single piece pulsed flow wing assembly method of claim 4 further comprising:
installing a wing side of body geometry tool as a dummy rib and pinning the wing side of body geometry tool to spar terminal fittings;
accurately locating forward and aft webs to the front spar and rear spar with DA holes in common to the spar terminal fittings;
loading an upper panel onto the ribs;
flexing an upper panel chord by pushers mounted on the wing side of body geometry tool until the DA holes in the webs and chords are aligned; and
installing temporary fasteners.

6. The single piece pulsed flow wing assembly method of claim 5 further comprising:
prior to releasing the MEs, confirming with load cells in point support mechanisms and fixture receivers that load of the wing structure is being borne by the headers of the AGVs.

7. The single piece pulsed flow wing assembly method of claim 5 further comprising:
positioning the headers on the AGVs for engagement of the MEs attached to the wing structure with a plurality of MAPS in a second assembly position;
extending the plurality of MAPS in the second assembly position to engage ME headers with fixture receivers in the plurality of MAPS;
clamping the fixture receivers to the ME headers; and
withdrawing the headers of the AGVs.

8. The single piece pulsed flow wing assembly method of claim 7 further comprising:
determining, with the planar laser, relative displacement from the wing reference frame of the defined measurement points on the wing structure; and
adjusting the plurality of MAPS to bring the measurement points back into wing reference frame position.

9. The single piece pulsed flow wing assembly method of claim 8 further comprising:
loading a lower wing panel onto the headers of the two AGVs;
synchronously moving the AGVs to position the lower wing panel under the wing structure supported in the plurality of MAPS in the second assembly position;
controlling in combination the headers and the AGVs to accomplish a synchronized multi-axis motion to insert the lower wing panel into position on the wing structure aligning DA holes in the lower wing panel with spar fitting points;
loading the lower wing panel using the support point mechanisms for firm engagement with the wing structure; and
monitoring of press up forces of the lower wing panel to the wing structure using load cells to assure that excessive forces are not used and if force limits are exceeded setting off audible and visual alarms and stopping the motion of the AGVs and associated fixtures.

10. The single piece pulsed flow wing assembly method of claim 9 further comprising:
flexing the lower wing panel using the pushers on a wing side of a wing-side of body geometry tool until DA holes in the front and aft webs are aligned with corresponding DA holes in a chord of the lower wing panel cord to set a contour;
sealing the lower wing panel; and
installing permanent tack fasteners.

11. The single piece pulsed flow wing assembly method of claim 10 further comprising:
adjusting the headers of the AGVs to assume a load of the wing structure;
releasing the MEs from the plurality of MAPS in the second assembly position;
retracting the plurality of MAPS; and
synchronously moving the wing structure with the AGVs to a third assembly position.

12. The single piece pulsed flow wing assembly method of claim 11 further comprising:
suspending a plurality of MAPS from a positioning truss mounted to a Floor Mounted Universal Holding Fixture (FUHF) for a third assembly position;
positioning the headers on the AGVs for engagement of the MEs on the wing structure with the fixture receivers of the plurality of MAPS in the third assembly position;
extending the plurality of MAPS in the third assembly position to engage the ME headers with the fixture receivers;
clamping the fixture receivers on the ME headers; and
withdrawing the headers of the AGVs.

13. The single piece pulsed flow wing assembly method of claim 12 further comprising:
determining with the planar laser relative displacement from the wing reference frame of the defined measurement points on the wing structure assembly; and
adjusting the plurality of MAPS in the third assembly position to bring the measurement points back into wing reference frame position.

14. The single piece pulsed flow wing assembly method of claim 13 further comprising:

bringing at least one Automated Wing Fastener Installation Systems (AWFIS) into operating position on positioning guideways under the FUHF, each AWFIS having an automated fastening head;

contacting a surface of the lower wing panel with the automated fastening head from the outside of the wing structure;

applying upward force in conjunction with an electromagnet on the automated fastening head energized to create an electromagnetic field pulling a steel backing plate inside the wing structure to provide sufficient clamping force to close any gaps between the structure; and drilling, countersinking, applying sealant, and inserting bolts into the lower wing panel and ribs or spars with the fastening head of the at least one AWFIS.

15. The single piece pulsed flow wing assembly method of claim 14 further comprising:

canting the wing structure dihedrally with actuators suspending a positioning truss from the FUHF;

lowering the wing structure onto a transfer dolly;

releasing the MEs are released from the plurality of MAPS;

retracting the plurality of MAPS; and pulsing the transfer dolly the next assembly position for an aircraft.

* * * * *